(12) United States Patent
Chen

(10) Patent No.: US 11,216,035 B2
(45) Date of Patent: Jan. 4, 2022

(54) COVER BOARD AND DISPLAY PANEL

(71) Applicant: Wuhan China Star Optoelectronics Semiconductor Display Technology Co., Ltd., Hubei (CN)

(72) Inventor: Xia Chen, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 267 days.

(21) Appl. No.: 16/623,153

(22) PCT Filed: Oct. 30, 2019

(86) PCT No.: PCT/CN2019/114300
§ 371 (c)(1),
(2) Date: Dec. 16, 2019

(87) PCT Pub. No.: WO2021/031344
PCT Pub. Date: Feb. 25, 2021

(65) Prior Publication Data
US 2021/0333833 A1    Oct. 28, 2021

(30) Foreign Application Priority Data
Aug. 21, 2019   (CN) .......................... 201910774163.8

(51) Int. Cl.
*G06F 3/00*    (2006.01)
*G06F 1/16*    (2006.01)
*G06F 3/01*    (2006.01)

(52) U.S. Cl.
CPC .......... *G06F 1/1652* (2013.01); *G06F 1/1641* (2013.01)

(58) Field of Classification Search
None
See application file for complete search history.

(56) References Cited

U.S. PATENT DOCUMENTS

| | | | |
|---|---|---|---|
| 6,597,416 B1 | 7/2003 | Momose | |
| 2015/0177849 A1* | 6/2015 | Shih | G06F 3/0202 345/174 |
| 2017/0374750 A1 | 12/2017 | Sun | |
| 2018/0182993 A1 | 6/2018 | Tang | |
| 2019/0140202 A1* | 5/2019 | Jin | H01L 51/0097 |
| 2020/0409421 A1* | 12/2020 | Cho | H01L 51/5237 |
| 2021/0272922 A1* | 9/2021 | Alves Dias | H01L 24/37 |

FOREIGN PATENT DOCUMENTS

| | | |
|---|---|---|
| CN | 105160999 A | 12/2015 |
| CN | 106783912 A | 5/2017 |
| CN | 108154802 A | 6/2018 |

* cited by examiner

*Primary Examiner* — Toan H Vu
(74) *Attorney, Agent, or Firm* — Taft Stettinius & Hollister LLP

(57) ABSTRACT

A cover board and a display panel are provided. The cover board used for the display panel includes a cover board body and reinforcing ribs. The cover board body is made of a flexible material. The reinforcing ribs are disposed within the cover board body. An extension direction of at least part of the reinforcing ribs is perpendicular to a bending direction of the cover board body. The cover board body is provided with the reinforcing ribs to allow the extension direction of the part of the reinforcing ribs to be perpendicular to the bending direction of the cover board body, thereby improving a bending performance of the cover board.

20 Claims, 4 Drawing Sheets

COVER BOARD AND DISPLAY PANEL

CROSS-REFERENCE TO RELATED APPLICATIONS

This application is a U.S. National Phase of International PCT Application No. PCT/CN2019/114300 filed Oct. 30, 2019, which claims the benefit of Chinese Patent Application Serial No. 201910774163.8 filed Aug. 21, 2019, the contents of each application are incorporated herein by reference in their entirety.

FIELD OF INVENTION

The present disclosure relates to the field of display technology, and in particular, to a cover board and a display panel.

BACKGROUND OF INVENTION

With the development of electronic products with high performance, flexible and bendable consumer electronic devices have attracted many major manufacturers to invest and develop these devices. To realize dynamically bendable display panels, it is necessary to introduce new material, new designs, and new production processes to improve performance of the bendable display panels.

In terms of the material, a great challenge is material of protective cover boards. The cover boards substitute for glass cover boards in hard screens and are attached to surfaces of display screens. A plastic material is generally employed for the cover boards, and the material is required to have a desirable bending tolerance, scratch resistance, and high surface hardness.

Currently, for the material of the cover boards commonly used in the industry, transparent polyimide is employed as a substrate, and surfaces of the cover boards are coated with a hard coating. A defect of the hard coating is that when the panel is bent outward, the coating is susceptible to cracking under tensile force, thereby reducing the bending property and reliability of the cover boards.

SUMMARY OF INVENTION

Embodiments of the present disclosure provide a cover board and a display panel to solve technical problems of a poor bending property and poor reliability of the cover boards of the conventional display panels.

The embodiments of the present disclosure further provide a cover board used for a flexible display panel, and the cover board includes:
a cover board body made of a flexible material; and
reinforcing ribs disposed within the cover board body;
wherein an extension direction of at least part of the reinforcing ribs is perpendicular to a bending direction of the cover board body;
wherein a refraction index of the reinforcing ribs is equal to a refraction index of the cover board body; and
wherein material of the reinforcing ribs is transparent organic polymer fiber or transparent inorganic fiber.

In the cover board of the present disclosure, the reinforcing ribs are arranged side by side and configured to be in a single layer In the cover board of the present disclosure, the reinforcing ribs are configured to be in multiple layers, and each layer of the reinforcing ribs extends in the same direction.

In the cover board of the present disclosure, each layer of the reinforcing ribs is arranged to be interlaced with each other.

In the cover board of the present disclosure, the reinforcing ribs are configured to be in multiple layers, and at least part of layers of the reinforcing ribs extend in different directions.

In the cover board of the present disclosure, material of the cover board body is polyester.

In the cover board of the present disclosure, the reinforcing ribs and the cover board body are combined and formed in a composite manner.

The embodiments of the present disclosure further provide a cover board used for a flexible display panel, and the cover board includes:
a cover board body made of a flexible material; and
reinforcing ribs disposed within the cover board body;
wherein an extension direction of at least part of the reinforcing ribs is perpendicular to a bending direction of the cover board body.

In the cover board of the present disclosure, the reinforcing ribs are arranged side by side and configured to be in a single layer.

In the cover board of the present disclosure, the reinforcing ribs are configured to be in multiple layers, and each layer of the reinforcing ribs extends in the same direction.

In the cover board of the present disclosure, each layer of the reinforcing ribs is arranged to be interlaced with each other.

In the cover board of the present disclosure, the reinforcing ribs are configured to be in multiple layers, and at least part of layers of the reinforcing ribs extend in different directions.

In the cover board of the present disclosure, all the reinforcing ribs are disposed at both sides of a bending neutral plane.

In the cover board of the present disclosure, a refraction index of the reinforcing ribs is equal to a refraction index of the cover board body.

In the cover board of the present disclosure, material of the reinforcing ribs is transparent organic polymer fiber or transparent inorganic fiber.

In the cover board of the present disclosure, material of the cover board body is polyester.

In the cover board of the present disclosure, the reinforcing ribs and the cover board body are combined and formed in a composite manner.

The present disclosure further relates to a display panel. The display panel includes the above-mentioned cover board and used for the flexible display panel. The cover board includes:
a cover board body made of a flexible material; and
reinforcing ribs disposed within the cover board body;
wherein an extension direction of at least part of the reinforcing ribs is perpendicular to a bending direction of the cover board body.

In the display panel of the present disclosure, the reinforcing ribs are arranged side by side and configured to be in a single layer.

In the display panel of the present disclosure, the reinforcing ribs are configured to be in multiple layers, and each layer of the reinforcing ribs extends in the same direction.

In the display panel of the present disclosure, each layer of the reinforcing ribs is arranged to be interlaced with each other.

In the display panel of the present disclosure, the reinforcing ribs are configured to be in multiple layers, and at least part of layers of the reinforcing ribs extend in different directions.

In the display panel of the present disclosure, a refraction index of the reinforcing ribs is equal to a refraction index of the cover board body.

In the display panel of the present disclosure, material of the reinforcing ribs is transparent organic polymer fiber or transparent inorganic fiber.

In the display panel of the present disclosure, material of the cover board body is polyester.

In the display panel of the present disclosure, the reinforcing ribs and the cover board body are combined and formed in a composite manner.

In comparison with the display panels in the prior art, the cover board and the display panel of the present disclosure improve the bending performance of the cover board by disposing the reinforcing ribs within the cover board body and rendering the extension direction of the part of the reinforcing ribs to be perpendicular to the bending direction of the cover board body, thereby solving the technical problems of the poor bending property and the poor reliability of the cover boards of the conventional display panels.

DESCRIPTION OF DRAWINGS

In order to clearly illustrate technical solutions in embodiments of the present disclosure, the drawings required for using in the description of the embodiments is briefly described below. The drawings in the following description are only parts of the embodiments of the present disclosure. For those skilled in the art, other drawings may also be obtained from these drawings without making for creative efforts.

DETAILED DESCRIPTION OF PREFERRED EMBODIMENTS

Referring to diagrams in drawings, the same component symbols therein represent the same components. The following description is based on specific embodiments exemplified by the present disclosure, and it should not be considered as limiting other specific embodiments that are not described herein.

Figure 1:
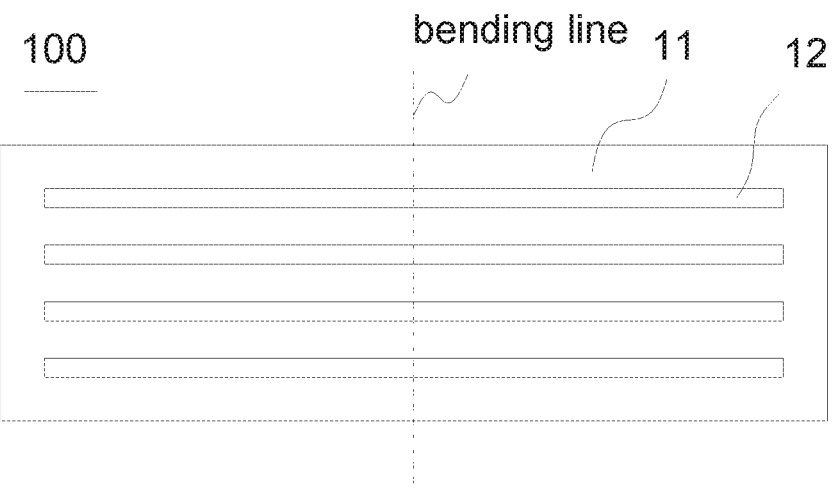
FIG. 1 is a schematic structural top view of a cover board of a first embodiment of the present disclosure.
Figure 2:
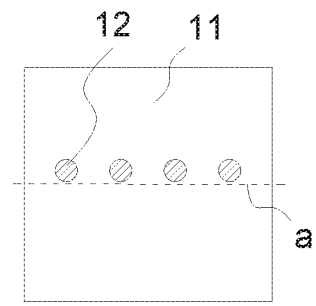
FIG. 2 is another schematic structural view of the cover board of the first embodiment of the present disclosure.

Referring to FIGS. 1 and 2, FIG. 1 is a schematic structural top view of a cover board of a first embodiment of the present disclosure, and FIG. 2 is another schematic structural view of the cover board of the first embodiment of the present disclosure.

The cover board 100 of the first embodiment of the present disclosure is used for a flexible display panel. The cover board 100 includes a cover board body 11 and reinforcing ribs 12.

The cover board body 11 is made of a flexible material. The reinforcing ribs 12 are disposed within the cover board body 11.

An extension direction of at least part of the reinforcing ribs 12 is perpendicular to a bending direction of the cover board body 11.

In the first embodiment of the present disclosure, the cover board body 11 and the reinforcing ribs 12 are employed to be shaped in a combination manner to enhance bending performance of the cover board 100. Moreover, the extension direction of the reinforcing ribs 12 is configured to be perpendicular to the bending direction of the cover board body 11, thus further elevating the bending performance of the cover board 100. It is noted that the term "perpendicular" mentioned in the present disclosure should be understood to be substantially perpendicular based upon common understanding of those skilled in the art since errors of the processes are inevitable.

Figure 3:
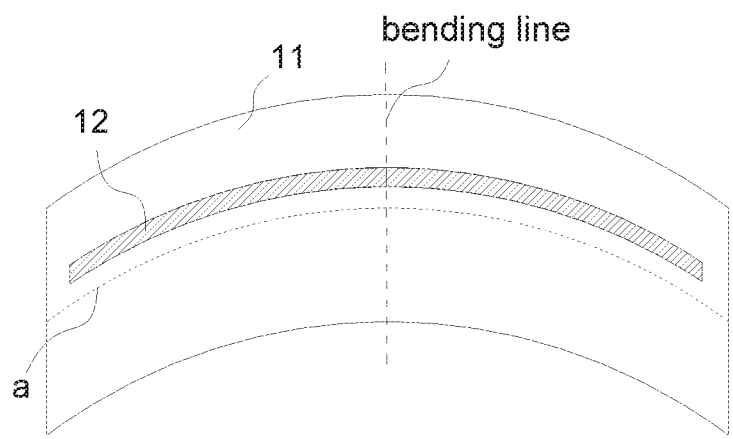
FIG. 3 is a schematic structural view of the cover board in a bending state of the first embodiment of the present disclosure.

In the first embodiment, the reinforcing ribs 12 are arranged side by side and configured to be in a single layer. All of the reinforcing ribs 12 are disposed at one or both of sides of a bending neutral plane a. In the first embodiment, all the reinforcing ribs 12 are disposed apart from the bending neutral plane a. That is, the reinforcing ribs 12 arranged side by side are disposed within a portion of an outer bending curve in the cover board body 11, as shown in FIG. 3.

Such disposition improves toughness of the cover board body 11 under tensile force of bending stress, thereby elevating reliability and the bending performance of the cover board 100.

Figure 4:
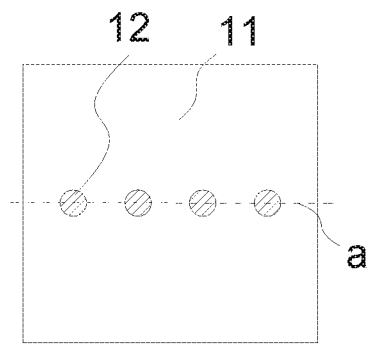
FIG. 4 is a schematic structural view of a cover board of a second embodiment of the present disclosure.

Certainly, in some of the embodiments, such as a second embodiment, as shown in FIG. 4, the reinforcing ribs 12 arranged side by side may also be disposed on locations of a center line of the cover board body 11. That is, centers of the reinforcing ribs 12 overlap the neutral plane a.

In the cover board 100 of the first embodiment of the present disclosure, a refraction index of the reinforcing ribs 12 is equal to a refraction index of the cover board body 11. Such disposition prevents refraction when light passes through a contact surface of the reinforcing ribs 12 and the cover board body 11, thereby affecting a display effect of the display panel.

Material of the reinforcing ribs 12 is transparent organic polymer fiber or transparent inorganic fiber. Both of the transparent organic polymer fiber and the transparent inorganic fiber function to enhance the bending property of the cover board 100. Certainly, the reinforcing ribs 12 of the present disclosure may also be other material enhancing the bending property.

Alternatively, the polymer fiber may be a cycloolefin material, an epoxy resin fiber, etc., and the inorganic material may be nano-scale metal, graphene, etc. Material of the cover board body 11 is polyester.

Moreover, the reinforcing ribs 12 and the cover board body 11 are combined and formed in a composite manner.

Figure 5:
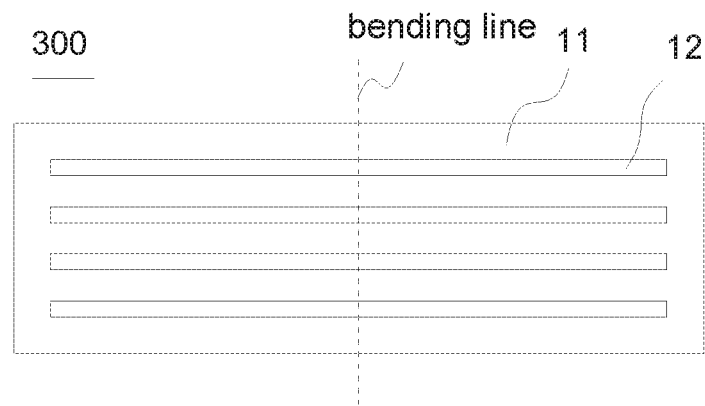
FIG. 5 is a schematic structural top view of a cover board of a third embodiment of the present disclosure.
Figure 6:
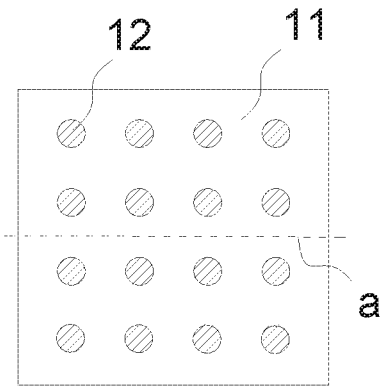
FIG. 6 is another schematic structural view of the cover board of the third embodiment of the present disclosure.

Referring to FIG. 5 and FIG. 6, FIG. 5 is a schematic structural top view of a cover board of a third embodiment of the present disclosure, and FIG. 6 is another schematic structural view of the cover board of the third embodiment of the present disclosure.

In the cover board 300 of the third embodiment of the present disclosure, the cover board 300 includes a cover board body 11 and the reinforcing ribs 12 disposed within the cover board body 11. The difference between the third embodiment and the first embodiment is that: the reinforcing ribs 12 are configured to be in multiple layers, and each layer of the reinforcing ribs 12 extends in the same direction. Such configuration further enhances the bending performance of the cover board 300.

Additionally, all the reinforcing ribs 12 are disposed at both sides of a bending neutral plane a.

Figure 7:
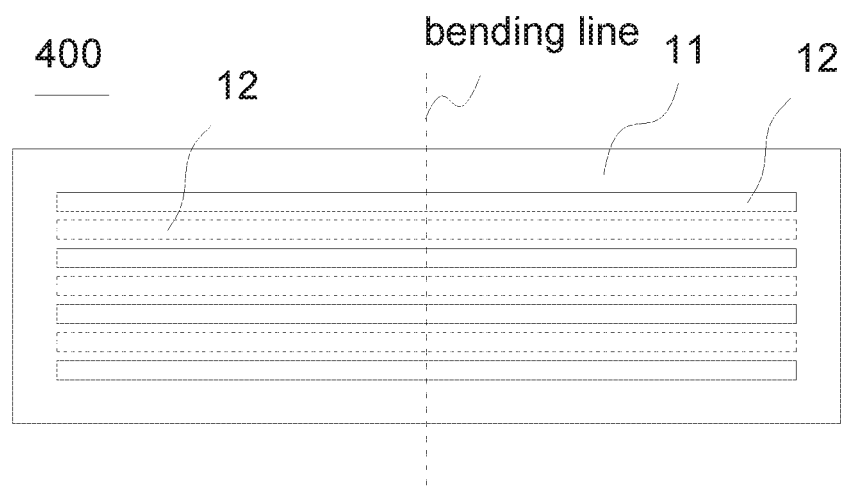
FIG. 7 is a schematic structural top view of a cover board of a fourth embodiment of the present disclosure.
Figure 8:
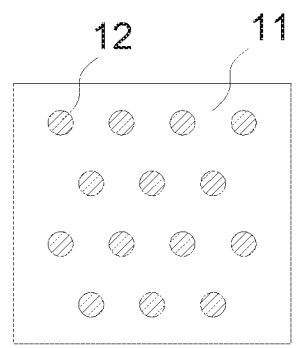
FIG. 8 is another schematic structural view of the cover board of the fourth embodiment of the present disclosure.

Referring to FIG. 7 and FIG. 8, FIG. 7 is a schematic structural top view of a cover board of a fourth embodiment of the present disclosure, and FIG. 8 is another schematic structural view of the cover board of the fourth embodiment of the present disclosure. In the cover board 400 of the fourth embodiment of the present disclosure, the cover board 400 includes a cover board body 11 and reinforcing ribs 12 disposed within the cover board body 11. The difference between the fourth embodiment and the third embodiment is that: each layer of the reinforcing ribs 12 is arranged to be interlaced with each other.

Such configuration further enhances the bending performance of the cover board 300.

Figure 9:
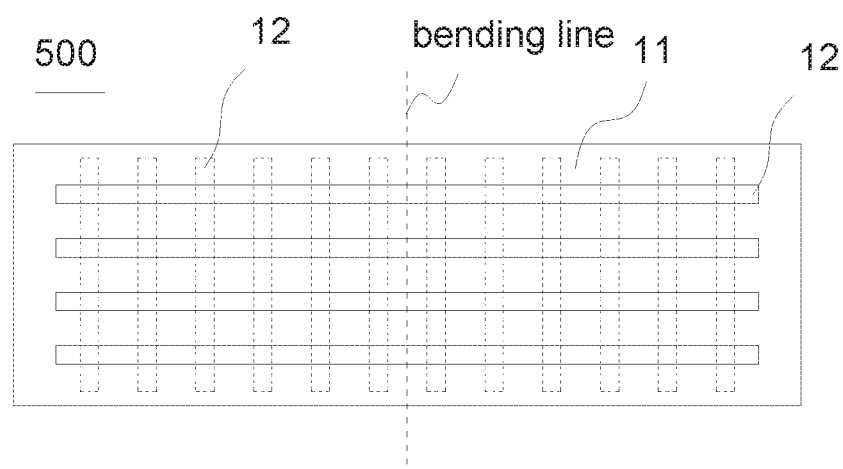
FIG. 9 is a schematic structural top view of a cover board of a fifth embodiment of the present disclosure.
Figure 10:
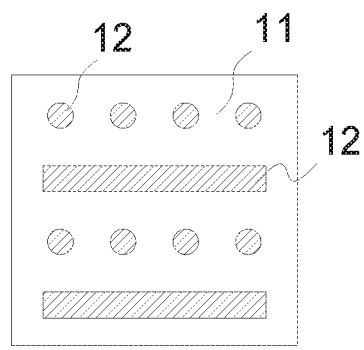
FIG. 10 is another schematic structural view of the cover board of the fifth embodiment of the present disclosure.

Referring to FIG. 9 and FIG. 10, FIG. 9 is a schematic structural top view of a cover board of a fifth embodiment of the present disclosure, and FIG. 10 is another schematic structural view of the cover board of the fifth embodiment of the present disclosure. In the cover board 400 of the fourth embodiment of the present disclosure, the cover board 500 includes a cover board body 11 and reinforcing ribs 12 disposed within the cover board body 11. The difference between the fifth embodiment and the third embodiment is that: the reinforcing ribs 12 are configured to be in multiple layers, and at least part of layers of the reinforcing ribs 12 extend in different directions. Such configuration further enhances the bending performance of the cover board 300.

It is noted that the structure, in which the extension directions of the reinforcing ribs 12 in adjacent layers are perpendicular to each other, is merely shown in the fifth embodiment, but it is not limited thereto. For example, each layer of the reinforcing ribs 12 extends in different directions. That is, an angle between the extension direction of each layer of the reinforcing ribs 12 and a bending line may be 90 degrees, 45 degrees, 0 degrees, or other angles.

The present disclosure further relates to a display panel, and the display panel includes the above-mentioned cover board used for the flexible display panel. The cover board includes a cover board body and reinforcing ribs. The cover board body is made of a flexible material. The reinforcing ribs are disposed within the cover board body.

An extension direction of at least part of the reinforcing ribs is perpendicular to a bending direction of the cover board body.

In the display panel of the present disclosure, the reinforcing ribs are arranged side by side and configured to be in a single layer.

In the display panel of the present disclosure, the reinforcing ribs are configured to be in multiple layers, and each layer of the reinforcing ribs extends in the same direction.

In the display panel of the present disclosure, each layer of the reinforcing ribs is arranged to be interlaced with each other.

In the display panel of the present disclosure, the reinforcing ribs are configured to be in multiple layers, and at least part of layers of the reinforcing ribs extend in different directions.

In the display panel of the present disclosure, a refraction index of the reinforcing ribs is equal to a refraction index of the cover board body.

In the display panel of the present disclosure, material of the reinforcing ribs is transparent organic polymer fiber or transparent inorganic fiber.

In the display panel of the present disclosure, material of the cover board body is polyester.

In the display panel of the present disclosure, the reinforcing ribs and the cover board body are combined and formed in a composite manner.

In comparison with the display panels in the prior art, the cover board and the display panel of the present disclosure improve the bending performance of the cover board by disposing the reinforcing ribs within the cover board body and rendering the extension direction of the part of the reinforcing ribs to be perpendicular to the bending direction of the cover board body, thereby solving the technical problems of the poor bending property and the poor reliability of the cover boards of the current display panels.

In the above description, according to the technical solutions and technical concepts of the present disclosure, those skilled in the art can make various corresponding alterations and modifications, and all of these alterations and modifications should belong to the protective scope of the appended claims of the present disclosure.

What is claimed is:

1. A cover board used for a flexible display panel, comprising:
   a cover board body made of a flexible material; and
   reinforcing ribs disposed within the cover board body;
   wherein an extension direction of at least part of the reinforcing ribs is perpendicular to a bending direction of the cover board body;
   wherein a refraction index of the reinforcing ribs is equal to a refraction index of the cover board body; and
   wherein material of the reinforcing ribs is transparent organic polymer fiber or transparent inorganic fiber.

2. The cover board according to claim 1, wherein the reinforcing ribs are arranged side by side and configured to be in a single layer.

3. The cover board according to claim 1, wherein the reinforcing ribs are configured to be in multiple layers, and each layer of the reinforcing ribs extends in the same direction.

4. The cover board according to claim 3, wherein each layer of the reinforcing ribs is arranged to be interlaced with each other.

5. The cover board according to claim 1, wherein the reinforcing ribs are configured to be in multiple layers, and at least part of layers of the reinforcing ribs extend in different directions.

6. The cover board according to claim 1, wherein material of the cover board body is polyester.

7. The cover board according to claim 1, wherein the reinforcing ribs and the cover board body are combined and formed in a composite manner.

8. A cover board used for a flexible display panel, comprising:
   a cover board body made of a flexible material; and
   reinforcing ribs disposed within the cover board body;

wherein an extension direction of at least part of the reinforcing ribs is perpendicular to a bending direction of the cover board body.

9. The cover board according to claim 8, wherein the reinforcing ribs are arranged side by side and configured to be in a single layer.

10. The cover board according to claim 8, wherein the reinforcing ribs are configured to be in multiple layers, and each layer of the reinforcing ribs extends in the same direction.

11. The cover board according to claim 10, wherein each layer of the reinforcing ribs is arranged to be interlaced with each other.

12. The cover board according to claim 8, wherein the reinforcing ribs are configured to be in multiple layers, and at least part of layers of the reinforcing ribs extend in different directions.

13. The cover board according to claim 8, wherein a refraction index of the reinforcing ribs is equal to a refraction index of the cover board body.

14. The cover board according to claim 8, wherein material of the reinforcing ribs is transparent organic polymer fiber or transparent inorganic fiber.

15. The cover board according to claim 8, wherein material of the cover board body is polyester.

16. The cover board according to claim 8, wherein the reinforcing ribs and the cover board body are combined and formed in a composite manner.

17. A display panel, comprising:
   a cover board, including:
      a cover board body made of a flexible material; and
      reinforcing ribs disposed within the cover board body;
      wherein an extension direction of at least part of the reinforcing ribs is perpendicular to a bending direction of the cover board body.

18. The display panel according to claim 17, wherein the reinforcing ribs are arranged side by side and configured to be in a single layer.

19. The display panel according to claim 17, wherein the reinforcing ribs are configured to be in multiple layers, and each layer of the reinforcing ribs extends in the same direction.

20. The display panel according to claim 19, wherein each layer of the reinforcing ribs is arranged to be interlaced with each other.

* * * * *